Feb. 2, 1960
C. H. ALLEN
2,923,309
FUEL FLOW DIVIDER
Filed June 13, 1957
2 Sheets-Sheet 1
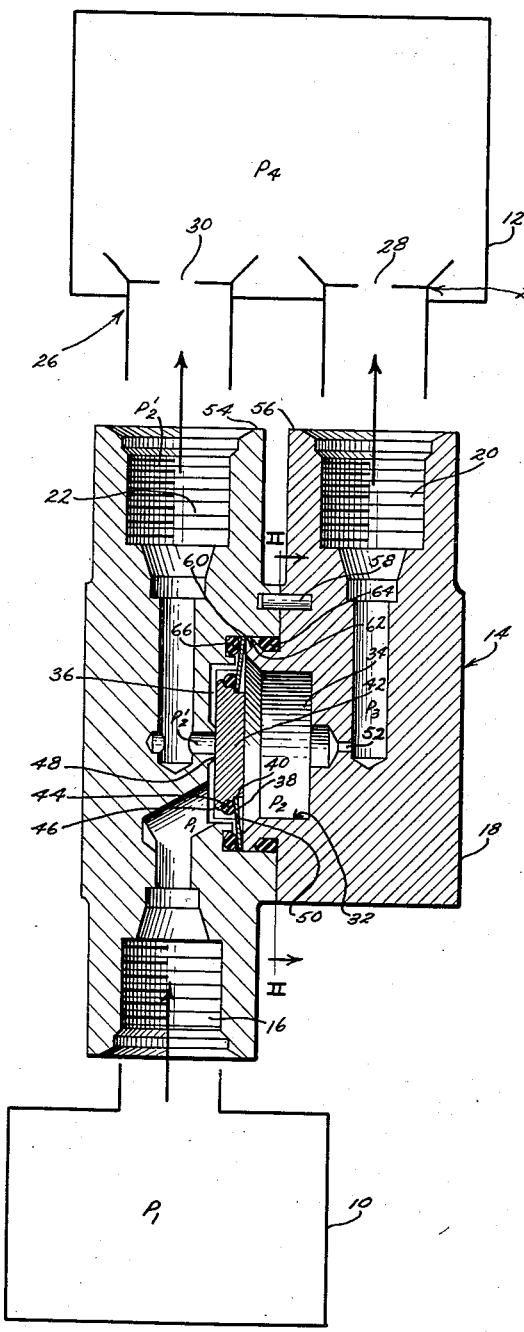
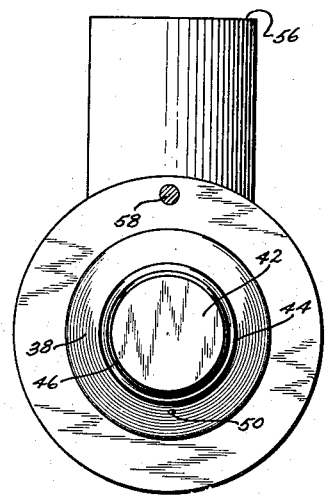
Inventor
CLIFFORD H. ALLEN

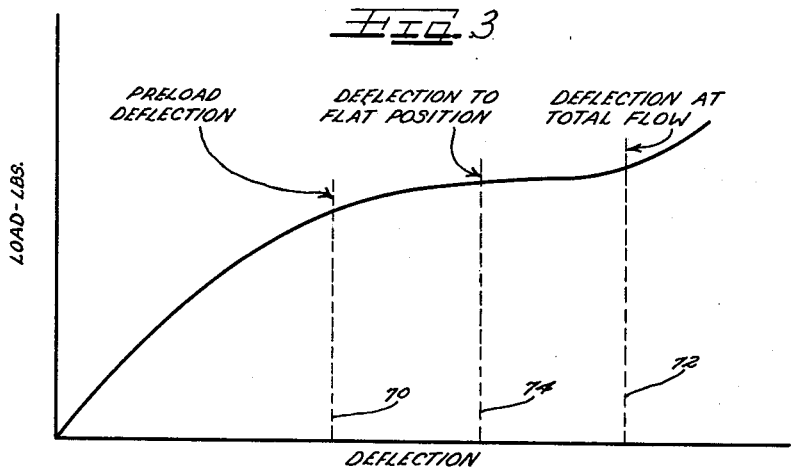
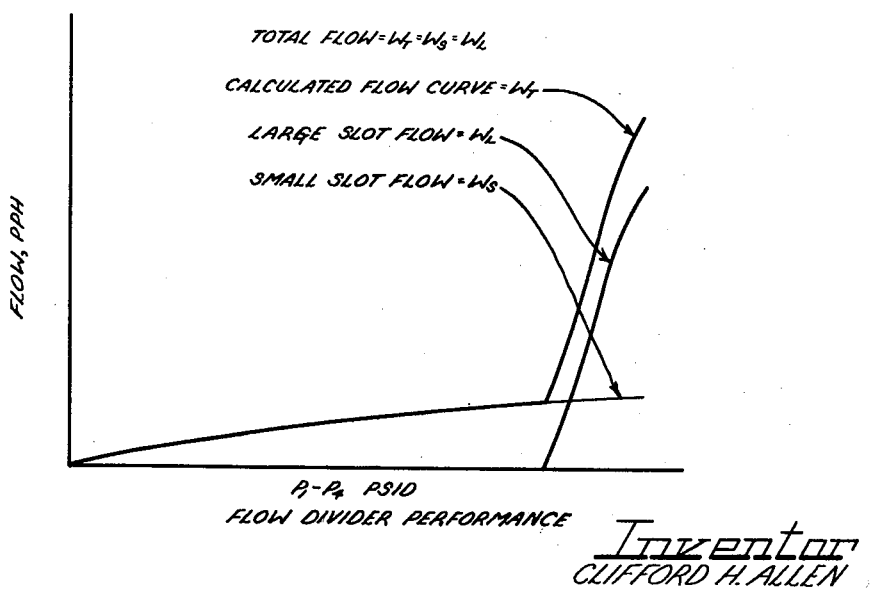

2,923,309

FUEL FLOW DIVIDER

Clifford H. Allen, Cleveland, Ohio, assignor to Thompson Ramo Wooldridge Inc., a corporation of Ohio Application June 13, 1957, Serial No. 665,535

1 Claim. (Cl. 137—118)

The present invention relates to methods and apparatus for controlling the flow of fuel in a pressure supply system to a combustion zone for widely varying rates of flow.

The invention particularly relates to a method and apparatus for fuel supply to a combustion zone employing controlled division of fuel flow between a low flow injector system and a high flow injector system in parallel relationship. The total fuel flow is determined by a separate device which relates total fuel supply to the requirements of the system. This separate device is not a part of this invention, but rather the present invention is intended to control the division of total fuel flow such that the resulting pressure differential ($P_1-P_4$, as shown in the drawings), is kept within allowable limits throughout the range of total fuel flows determined by the above-mentioned separate device.

The low flow orifice injector provides minimum fuel requirements when the system is operating at a minimum energy level, and has a fixed flow resistance. The high flow orifice injector supplements the low flow orifice injector at higher energy levels and handles the widely varying requirements for rates of fuel flow. The high flow orifice system has a variable resistance which is automatically controlled to make the system capable of handling the varying rates of fuel flow without requiring wide variations in pressure differential.

The resistance of the high flow orifice injector system is varied in accordance with pressure differential of the entire system as sensed in the variance of rate of fuel flow through the low flow orifice injector system. This variance is sensed by the provision of a flow restriction in the low flow orifice system and measuring the pressure drop across the restriction and controlling the resistance of the high flow orifice system in accordance with this pressure drop. The pressure drop is reduced by a second flow restriction downstream and in series with the first flow restriction.

More specifically, the invention employs specific apparatus utilizing a first low flow orifice injector and a second high flow orifice injector with first and second fuel flow conduits leading to the injectors. A valve chamber is positioned between the fuel flow conduits and the common pressure supply, and provides a first side to which the first conduit is connected and a second side to which the second conduit is connected. The sides of the valve chambers are divided by a flat spring washer carrying a movable valve member controlling the flow of fuel through the port located where the second conduit leads from the valve chamber. A flow restricting orifice extends through the flat spring washer to conduct fuel to the first conduit and create a pressure differential across the spring washer which flexes in accordance with the pressure differential to control the position of the movable valve member. A second flow restricting orifice is located downstream in the first conduit to decrease the pressure differential across the first flow restricting orifice in the flat spring washer carrying the movable valve member.

Accordingly, it is an object of the present invention to provide a method and apparatus for controlling the flow of fuel in a pressure fuel supply system leading to a combustion zone capable of handling large variations in fuel flow without requiring wide variations in pressure differential.

A more specific object of the invention is to provide a method and apparatus for controlling the flow of fuel in accordance with the above objective utilizing two injectors with a flow dividing valve to control the flow of fuel to one of the injectors.

Another object of the invention is to provide a fuel flow control system utilizing a first injector to provide minimum fuel requirements, and a second injector which handles a widely varying rate of fuel flow.

Another object of the invention is to provide an improved simplified fuel flow control system requiring a minimum number of parts with an uncomplicated reliable construction.

A still further object of the invention is to provide a fuel flow control system for supplying widely varying rates of fuel demand without requiring wide variations in pressure differential, and especially adapted to reliable use for an auxiliary power system in an aircraft such as a rocket wherein the system will be subjected to variations in temperature, severe acceleration forces, vibration and shock.

Other objects and advantages will become more apparent from the teachings of the principles of the invention in connection with the disclosure of an embodiment thereof in the specification, claim and drawings, in which:

Figure 1 is a vertical sectional view taken through a flow control system employing a flow control valve in accordance with the principles of the present invention;

Figure 2 is a sectional view taken along line II—II of Figure 1;

Figure 3 is a graph plotting the displacement of the spring diaphragm and the valve carried by the diaphragm against the pressure differential load; and, Figure 4 is a graph plotting the pressure differential of the overall system against the flow through the system.

In Figures 1 and 2 of the drawings, fuel is supplied from the pressure supply source, shown schematically at 10, to a combustion zone, shown schematically at 12. The flow of fuel from the supply and to the combustion zone 12 is controlled by a control apparatus 14.

The pressure in the fuel supply 10 is shown as $P_1$ and the pressure in the combustion zone is shown as $P_4$. The pressure differential $P_1-P_4$ varies over a relatively small range. However, the fuel flow demands of the combustion zone 12 from the supply 10 vary over a considerable range and at rates varying throughout the range. A feature of the flow control apparatus 14 is, therefore, the ability to handle the widely varying rates of fuel flow demand within relatively small variations in pressure differential and without requiring wide variations in pressure differential.

Thus, a requirement for the flow divider is operation within limited ranges or pressure drops ($P_1-P_4$). Should the pressure drop ($P_1-P_4$) be too low at the lower portions of the flow range it would force components in other parts of the fuel system to operate outside their design conditions. Should the pressure drop ($P_1-P_4$) be too high at the higher flow rates it would raise the fuel system pressure level upstream of the flow divider to undesirable values.

Another requirement of the system is the provision of a continuous supply of fuel to be fed into the combustion zone 12. Interruptions in the supply of fuel will cause discontinuation of operation or improper operation in the combustion zone and interruptions of flow through the system may cause other undesirable effects, such as overheating of conduits and clogging of flow ports. The design must be such as to insure an uninterrupted fuel flow even with an undershoot in the control system causing a very low pressure drop across the system, i.e., $P_1-P_4$. The present control apparatus 14 permits the pressure differential $P_1-P_4$ to assume very low values without interrupting a constant flow of fuel, and an uninterrupted fuel flow will be maintained at all times unless upstream supply controls are completely closed.

Thus, the fuel requirements of the system are determined by a control means which controls the fuel flow rate in accordance with these requirements. This control system may take various forms and the flow dividing apparatus 14 operates in accordance with the total fuel flow rate provided by the control system.

Fuel flows into the flow control apparatus 14 from the pressure supply 10 to the supply conduit or passage 16 in the housing 18 for the control apparatus. Fuel discharges from the control apparatus through a first conduit or passage 20 and a second conduit or passage 22.

The first passage 20 leads to a first injector 24 which is referred to as a low flow orifice injector. The second passage 22 leads to a second injector 26 which may be referred to as a high flow orifice injector. Both injectors 24 and 26 are arranged to discharge into the combustion zone 12 which is shown diagrammatically. The low flow orifice injector 24 is shown as having a discharge nozzle opening or orifice 28 and the high flow orifice injector is shown as having a discharge nozzle opening or orifice 30.

A valve chamber 32 is located in the housing 18 positioned in the flow path between the supply conduit 16 and the two downstream conduits 20 and 22 leading to the low flow orifice injector 24 and the high flow orifice injector 26, respectively. The valve chamber has a first side 34 and a second side 36, with the first passage 20 connected to the first side of the valve chamber and the second passage 22 connected to the second side 36 of the valve chamber.

Extending across the valve chamber 32 and separating the first side 34 from the second side 36 is a diaphragm consisting of a spring washer 38 of the type commonly known as a Belleville spring. The spring washer or Belleville spring diaphragm 38 provides a flow divider for the fluid fuel flowing from the supply passage 16 to the conduits 20 and 22.

The spring diaphragm 38 has a centrally located opening 40, as shown in Figures 1 and 2, in which is mounted a movable valve member 42 which moves with deflection of the spring diaphragm. The valve member 42 is suitably secured in the opening 40 of the spring diaphragm, and the joint between the valve member 42 and the opening 40 is sealed by an O-ring seal 44, which is located under the flange 46 of the valve member 42.

The valve member cooperatively coacts with the valve port 48 which is defined at the location where the second conduit 22 enters the valve chamber 36. Thus, it will be seen that the opening of the valve port 48 will be controlled by the position of the movable valve member 42, which is carried and controlled by the spring diaphragm 38.

The position of the spring diaphragm and of the movable valve member or valve head 42 is determined by the pressure differential across the diaphragm 38. The pressure downstream of the spring diaphragm 38 is shown at $P_2$ and the pressure upstream, which is in the second valve chamber 36 is $P_1$, which is the pressure of the fuel supply system. The pressure differential $P_1-P_2$ is determined by the pressure differential across the flow restricting orifice 50, which is an orifice or opening through the wall of the spring diaphragm 38. The total flow of fuel from the supply conduit 16 to the first conduit 20 leading to the low flow orifice injector 24 passes through the flow restricting orifice 50.

The pressure differential $P_1-P_2$ across the flow restricting orifice 50 is, of course, dependent upon the rate of flow through this orifice. The division of flow through the low flow orifice and the high flow orifice depends upon the position of the valve head 42 in relation to the valve port 48. This division or ratio of flow tends to increase in favor of the high flow orifice as the valve head is forced away from the valve port 48.

Thus, when the total fuel flow through the flow divider is increased, a small portion of this increased flow is forced through the low flow orifice and this results in an increase in the pressure differential $P_1-P_2$. This in turn causes the valve head to move further away from the valve port 48, thus increasing the opening of the valve port 48 and the rate of flow therethrough. This increases the division of flow in favor of the high flow orifice so that the high flow orifice carries a greater proportion of the increased total flow than does the low flow orifice, and without imposing as great a pressure differential $P_1-P_4$ resisting the total flow as would have resulted without the above-described movement of the valve head.

Thus, it will be seen that the flow through the high flow orifice injector is controlled in accordance with the flow through flow restricting orifice 50 to the low flow orifice injector 24, or in accordance with the pressure differential across the spring diaphragm 38.

The flow system of the low flow orifice injector includes the supply conduit 16, the flow restricting orifice 50, the downstream fixed restriction series orifice 52, the first passage 20, and the low flow orifice injector 24. The low flow orifice injector flow system, therefore, has a fixed flow resistance and the fuel flow is dependent upon the pressure differential $P_1-P_4$.

The fuel flow system for the high flow orifice injector, however, has a variable resistance. The flow system for the high flow orifice injector 26 includes the supply passage 16, the control valve including the valve head 42, and valve port 48, the second passage 22, and the high flow orifice injector 26. The variable resistance is provided by the valve members 48 and 42.

The housing or body for the control apparatus 14, which houses the conduits and control valve, may be formed of a suitable material, such as plastic or metal, and is preferably made of non-corrosive material, such as aluminum or stainless steel. The housing is illustrated as being formed of two sections 54 and 56, which are suitably secured together and are shown as being matched by an annular projection 60, which is received by an opening 62 in the housing portion 54 in telescoping relationship. The opening in the center of the annular flange 60 provides the first valve chamber 34. An O-ring 64 is positioned around the outside of the annular flange 60 in order that the parts 54 and 56 may come together in fluid-tight relationship.

The upper edge of the flange 60 holds the spring diaphragm 38 in place and an O-ring seal 66 is set in a groove in the opening 62 to seal the edge of the spring diaphragm 38.

The valve head 42 and O-rings are made of materials which are resistant to corrosion factors such as contained in various types of fuels and must withstand temperature variations. The material forming this valve head 42 is sufficiently hard to prevent material flow as a result of Belleville spring preload.

It will be noted from the foregoing description that the valve head 42 is positioned in accordance with the pressure differential across the spring diaphragm 38. This pressure differential varies with flow through the flow restricting orifice 50, as determined by the control pressure differential $P_1-P_4$. It is desirable that the valve head 42 be varied in position linearly with the change in pressure differential across the spring diaphragm 38, $P_1-P_2$. The pressure differential across the flow restricting orifice is a function of fuel flow through the low flow orifice injector 24, and at the same time determines the loading of the Belleville spring. By properly selecting the area of the fixed orifice 50, spring stiffness, and the diameter of the variable orifice 48, and by dimensioning of the component parts, a fuel flow division which meets the specified requirements can be provided.

Space restrictions limit the outside diameter of the spring diaphragm 38, thus sharply limiting its design energy absorbing capacity. To restrict the operational limits of the pressure differential across the orifice 50, $P_1-P_2$, the second downstream fixed restriction 52 is provided in series with the restrictor 50. This restriction 52 reduces the operating range of the pressure differential $P_1-P_2$, which is encountered across the spring diaphragm 38 and improves its response.

As illustrated in Figure 3, the spring diaphragm preferably is operated within the range between the dotted line 70 and the dotted line 72. This is the most flat portion of the curve and deflection response to pressure differential change will be most linear. The dotted line 70 shows the deflection of the spring diaphragm as it is pre-loaded. The dotted line 72 illustrates the maximum deflection at maximum flow when the control pressure differential $P_1-P_4$ is maximum. Operation of the spring, therefore, will occur between the ranges of the limits of lines 70 and 72, and the spring washer 38 is in a flat position at line 74, somewhere between limits 70 and 72.

Thus, the low flow orifice injector 24 provides minimum fuel requirements when the system is operating at the minimum energy level. As the energy level requirements increase, flow begins through the high flow orifice injector 26, which supplements the low flow orifice flow and handles the increase and varying rates of fuel flow. The two injector systems are in parallel relationship, i.e. their total pressure differentials are equal regardless of flow conditions. It is the function of the flow divider valve members 48 and 42, to control the flow to the high flow orifice 26. When increased fuel supply is demanded by the fuel control system, the resistance of the high flow orifice injection system is decreased, permitting increased fuel flow through the high flow orifice injector and maintaining the total pressure differential of both injector systems within the desired limits.

An illustration of the flow characteristics of the system may be seen in Figure 4. As may be observed from the captions indicating the curves of the graph, the low flow orifice flow $W_s$ increases substantially parabolically with increase of control pressure differential, $P_1-P_4$. At a certain minimum $P_1-P_4$, fuel flow begins through the high flow orifice injector system, as indicated by the curve for high flow orifice flow $W_L$. The two flows combine to give the total flow curve $W_T$. As will be noted, this flow varies rapidly in rate with small variations in control pressure differential, $P_1-P_4$.

It is desirable to have operations arranged wherein flow is obtained through both the low flow orifice injector 24 and the high flow orifice injector 26 for most of the period of operation. This will obtain a flow through the injector tubes or conduits which maintain cooling of the tubes and resists clogging of the injector ports. If necessary, however, a by-pass system is provided around the valve members 48 and 42 to continue flow through the high flow orifice injector when the valve 42 closes.

It will be recognized that fuel flow continues at minimum requirements when the valve 42 closes and flow no longer continues through the high flow injection orifice 26. This is continued even when the control for regulating fuel flow undershoots to give a very low flow.

Thus, it will be seen that I have provided a flow control method and apparatus which meets the objectives and advantages hereinbefore set forth. A continuous flow stream is obtained through all ranges of operation and varying rates of flow over wide ranges will be accommodated with small pressure differentials which do not effect operating elements in other related systems.

The flow control apparatus is simple in construction and assembly and will operate reliably without careful adjustment or regulation, and will operate over a desired operating life. The system is rugged and is well able to withstand the rigors of use in a high speed flight unit such as encountered when used in a rocket power system.

I have, in the drawings and specification, presented a detailed disclosure of the preferred embodiment of my invention, but it is to be understood that I do not intend to limit the invention to the specific form disclosed, and intend to cover all changes, modifications and alternative constructions and methods falling within the scope of the appended claim.

I claim:

A flow divider adapted for a fuel system having a source of pressurized fuel and a combustion zone with a first small capacity injector supplied with fuel from said source through a first conduit and a second large capacity injector supplied with fuel from said source through a second conduit comprising housing means defining a valve chamber, a valve port in said valve chamber adapted to communicate with said second conduit, a movable valve member in said valve chamber coacting with said port, an annular spring washer having an outer peripheral portion sealingly secured in said valve chamber radially outward from said valve port and an inner peripheral portion sealingly secured to said valve member, said spring washer and valve member dividing said valve chamber into an upstream chamber communicating with the valve port and a downstream chamber adapted to communicate with the first conduit, said spring washer having an orifice therethrough radially outward from the valve member joining the upstream and downstream chambers, and means biasing the outer peripheral portion of the spring washer to move the valve means against the port and preload the spring washer whereby fuel may flow from the source to the first conduit through said orifice and the pressure drop across the spring washer will vary the load on the spring washer to control the position of the valve member relative to the port and thereby control fuel flow from the source to the second conduit.

References Cited in the file of this patent

UNITED STATES PATENTS

| | | |
|---|---|---|
| 2,617,478 | Hildestad | Nov. 11, 1955 |
| 2,731,976 | Orent et al. | Jan. 24, 1956 |
| 2,761,462 | Snyder | Sept. 4, 1956 |